J. S. GAGE.

Seed-Drill Attachment.

No. 2,041.

Reissued Aug. 1, 1865.

Witnesses:

R. T. Campbell

E. Schafer

Inventor.

John S. Gage by his Att'ys,

Mason, Fenwick & Lawrence

N. PETERS, PHOTO-LITHOGRAPHER, WASHINGTON, D. C.

UNITED STATES PATENT OFFICE.

JOHN S. GAGE, OF DOWAGIAC, MICHIGAN.

IMPROVEMENT IN SEED-COVERERS FOR GRAIN-DRILLS.

Specification forming part of Letters Patent No. 36,291, dated August 26, 1862; Reissue No. 2,041, dated August 1, 1865.

*To all whom it may concern:*

Be it known that I, JOHN S. GAGE, of Dowagiac, Cass county, State of Michigan, have invented an Improvement in Seed-Coverers for Grain-Drills; and I do hereby declare that the following is a full, clear, and exact description thereof, reference being had to the accompanying drawings, making a part of this specification, in which—

Figure 1:
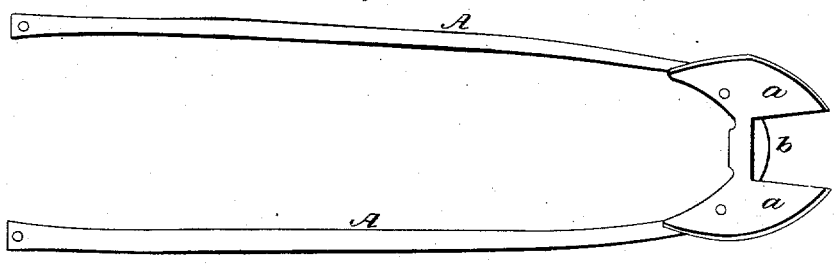
Figure 2:
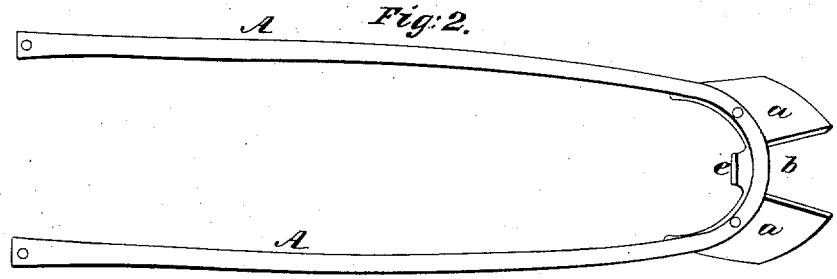
Figure 3:
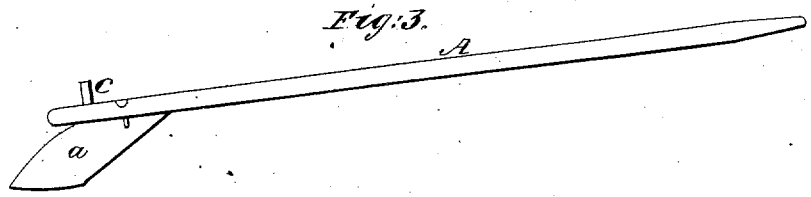

Figure 1 is a top view of the coverer applied to its drag-bars. Fig. 2 is a bottom view. Fig. 3 is a side view.

Similar letters of reference indicate corresponding parts in the several figures.

The object of my invention is to so form the seed-coverers of seeding-machines that they will collect the earth over the seed in a more perfect manner than hitherto, and will not be liable to clog up with earth which is slightly wet or adhesive, but will always clear themselves and keep in good working order, thus requiring less power to draw the machine, and obviating the necessity hitherto existing of stopping the machine to clean or clear the coverers.

Another object of my invention is to provide for loading the coverers when the earth is compact and hard, so as to cause them to enter the earth and cover the seed much better than they otherwise could, as will be hereinafter described.

To enable others skilled in the art to understand my invention, I will describe its construction and operation.

In the accompanying drawings I have represented my improved seed-coverer applied to drag-bars or arms A, which, when used, are pivoted to the frame of the seeding-machine and incline backward, so as to drag the coverers along in rear of the seed-dropping contrivances, for collecting the earth over the seed after it is dropped.

The coverers consist of plates of a concavo-convex form. The bottom side of each plate or coverer is concave, and its sides are parallel for a short distance, and then terminate in abrupt curves or angular edges inclining inward, as shown in the drawings. The acting part of the coverer consists of two palms, *a a*, which have an arched or other formed space, *b*, between them, which extends from their points upward some distance for the purpose of allowing the earth which is collected toward it by the palms *a a* to freely escape. The curved or angular edges of the two palms are at an angle to the line of draft, which is partly produced by the concave form of the bottom side of the coverer and partly by giving a tapering form or inclination to these edges. This construction of coverer causes the earth on each side of the seed to be collected over the seed as the machine is moved along, and the superfluous earth is allowed to escape through the space *b*, instead of being carried along with the coverer, as hitherto.

In Figs. 2 and 3 I have represented a lug, *c*, formed on or otherwise applied to the upper edge of the coverer for the purpose of receiving and retaining in place suitable weights. The weights are used when the coverers are not sufficiently heavy to perform good work in hard or compact earth. By increasing the weight of the coverers they will be prevented from gliding over the surface of the earth without scraping or gathering it over the seed.

It is obvious that in many cases or uses the lug *c* may be dispensed with without altering the covering properties of my contrivance, and although I consider it advantageous to use the lug, still I regard my invention as consisting in the peculiar formation of the coverer, whether furnished or not with the lug *c*.

The two palms *a a* serve to compress the earth into a ridge over the seed, while the intermediate connection *e* smooths and presses down the ridge. The position of my coverer while in operation is such that the slightly-curved edges of the palms *a a* are in or nearly in a horizontal plane, while the parallel edges of the upper portion of the coverer incline downward and backward. It will thus be seen that my coverer must be arranged to work in an inclined position, so that the concave surface thereof will gradually collect and compress the earth about the seed and level the ridge, so as to leave it smooth and in a good condition to favor the growth of the plants.

The invention which I have described is especially advantageous as an attachment to the seed-drills for which letters patent were granted to me, No. 29,071, and to myself and P. D. Beckwith, No. 34,955, as the concave surface and the bottom edge of the coverer adapt it for being hinged by the arms A A to the under side of the forward part of the frame, the forward ends of the arms A A being attached to the forward part of the frame of the seed-drill, while the ends of the arms are pendent and carry the coverers.

Having thus described my invention, what I claim as new, and desire to secure by Letters Patent, is—

1. The seed-coverer, as herein described, constructed with two concave or converging arched palms, *a a*, which are shaped on their rear and bottom edges as represented, and are connected by an intermediate portion, *e*, so as to have a space, *b*, between them, the said coverer being made of one piece of metal only, and adapted to be applied to the nearly-horizontal arms A A of the seeding-machine, so as to operate upon the sides and top of the ridge or row, as herein specified.

2. Providing the coverer with a lug, *c*, adapted to receive a weight, substantially as described.

JOHN S. GAGE.

Witnesses:
N. B. HOLLISTER,
P. D. BECKWITH.